Feb. 26, 1957 W. DOBLE ET AL 2,782,723
SHAFT SEAL FOR PUMPS
Filed Oct. 22, 1951 2 Sheets-Sheet 1

INVENTORS.
WARREN DOBLE
ALBERT E. DOERR
BY THEIR ATTORNEYS.
HARRIS, KIECH, FOSTER & HARRIS

Feb. 26, 1957 W. DOBLE ET AL 2,782,723
SHAFT SEAL FOR PUMPS
Filed Oct. 22, 1951 2 Sheets-Sheet 2
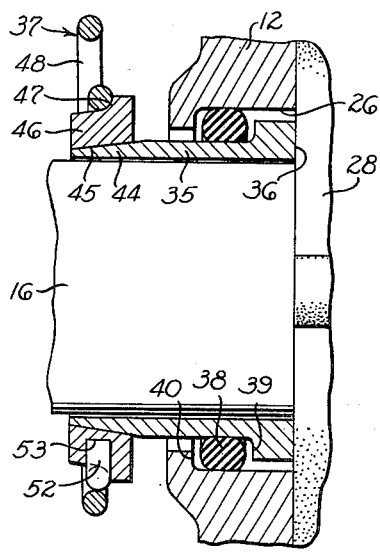
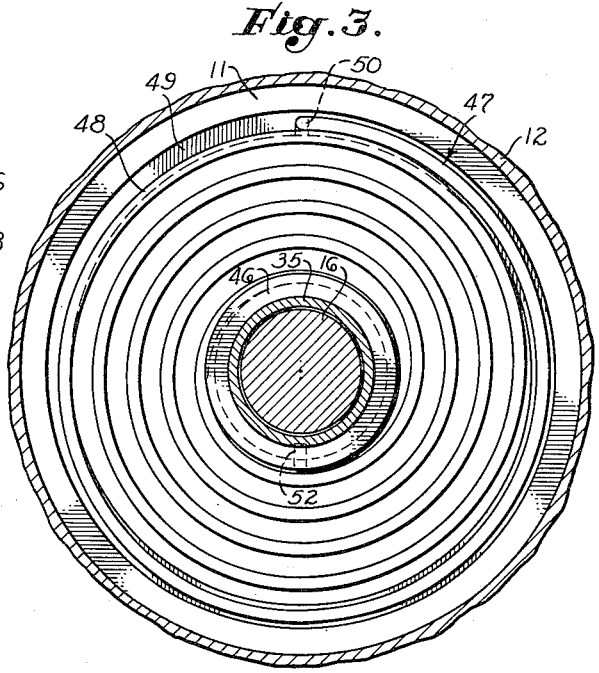
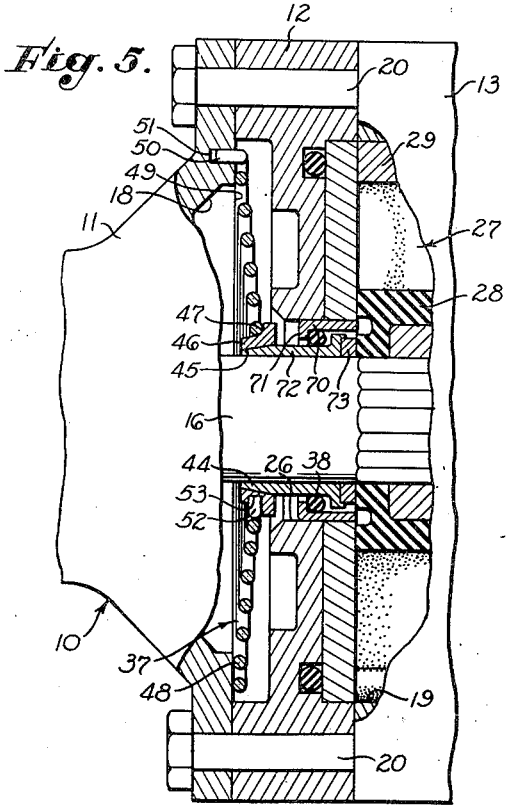
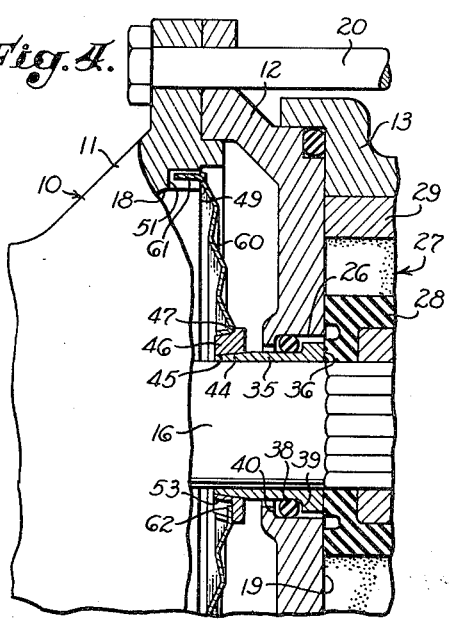
INVENTORS.
WARREN DOBLE
ALBERT E. DOERR
BY THEIR ATTORNEYS.
HARRIS, KIECH, FOSTER & HARRIS

United States Patent Office 2,782,723
Patented Feb. 26, 1957

2,782,723

SHAFT SEAL FOR PUMPS

Warren Doble, North Hollywood, Calif., and Albert E. Doerr, Mexico City, Mex., assignors, by mesne assignments, to Jabsco Pump Company, Burbank, Calif., a corporation of California Application October 22, 1951, Serial No. 252,544

2 Claims. (Cl. 103—117)

The present invention relates in general to shaft seals and, more particularly, to a shaft seal for a rotary pump having an impeller on a shaft which extends into a pumping chamber for the impeller, a primary object of the invention being to provide a shaft seal which minimizes the number of parts that must be removed and cleaned whenever the impeller and pumping chamber are cleaned.

Since the invention is particularly applicable to a vane-type rotary pump having an impeller of rubber-like material, it will be considered in connection therewith herein for purposes of illustration. In such a pump, the rubber-like impeller includes a hub which encloses the end of the shaft which extends into the pumping chamber, so that it is necessary to seal at only one point on the shaft.

Another object of the invention is to provide a shaft seal which includes a sealing sleeve encompassing the shaft and biased into sealing engagement with one end of the hub of the rubber-like impeller.

An important object is to provide a shaft seal which includes spring means isolated from the pumping chamber for biasing the sealing sleeve into sealing engagement with the hub of the impeller so that the material pumped does not come in contact with such spring means.

Another object is to provide an annular sealing element between the sealing sleeve and an end wall of the pumping chamber, the annular sealing element, the sealing sleeve and the hub of the impeller cooperating to prevent leakage along the shaft from the pumping chamber.

With this construction, the only elements of the shaft seal which must be removed for cleaning when cleaning of the impeller and pumping chamber is necessary are the sealing sleeve and the annular sealing element between it and the end wall of the pumping chamber. Thus, the present invention greatly facilitates cleaning of the pump, or cleaning and sterilizing thereof, as in a pump for food products, which is an important feature.

Another object is to provide such a shaft seal wherein the spring means for biasing the sealing sleeve into engagement with the hub of the impeller engages the housing of the pump and engages a collar which, in turn, engages the sealing sleeve, the sealing sleeve being separable from the collar so that removal of the collar for cleaning is not necessary.

Another object is to provide such a shaft seal wherein the spring means is anchored to the housing and the collar is anchored to the spring means so that the collar and the spring means are held stationary. In this connection, another object is to provide the sealing sleeve with a frusto-conical surface which is adapted to seat in a frusto-conical socket in the collar so that the collar prevents rotation of the sealing sleeve, assisted by the annular sealing element between the sealing sleeve and the end wall of the pumping chamber. With this construction, all relative movement, and therefore all wear, occurs between the sealing sleeve and the impeller hub, thereby minimizing the number of parts which must be replaced because of wear.

The foregoing objects and advantages of the present invention, together with various others which will become apparent, may be attained with the exemplary embodiments of the invention which are illustrated in the accompanying drawings and which are described in detail hereinafter. Referring to the drawings:

Fig. 2 is a fragmentary sectional view on an enlarged scale which duplicates a portion of Fig. 1 and which illustrates various elements of the shaft seal;

Fig. 3 is a fragmentary, transverse sectional view taken along the arrowed line 3—3 of Fig. 1 in the direction of the arrows on such line;

Fig. 4 is a fragmentary sectional view illustrating another embodiment of the invention; and Fig. 5 is a fragmentary sectional view illustrating still another embodiment of the invention.

Figure 1:
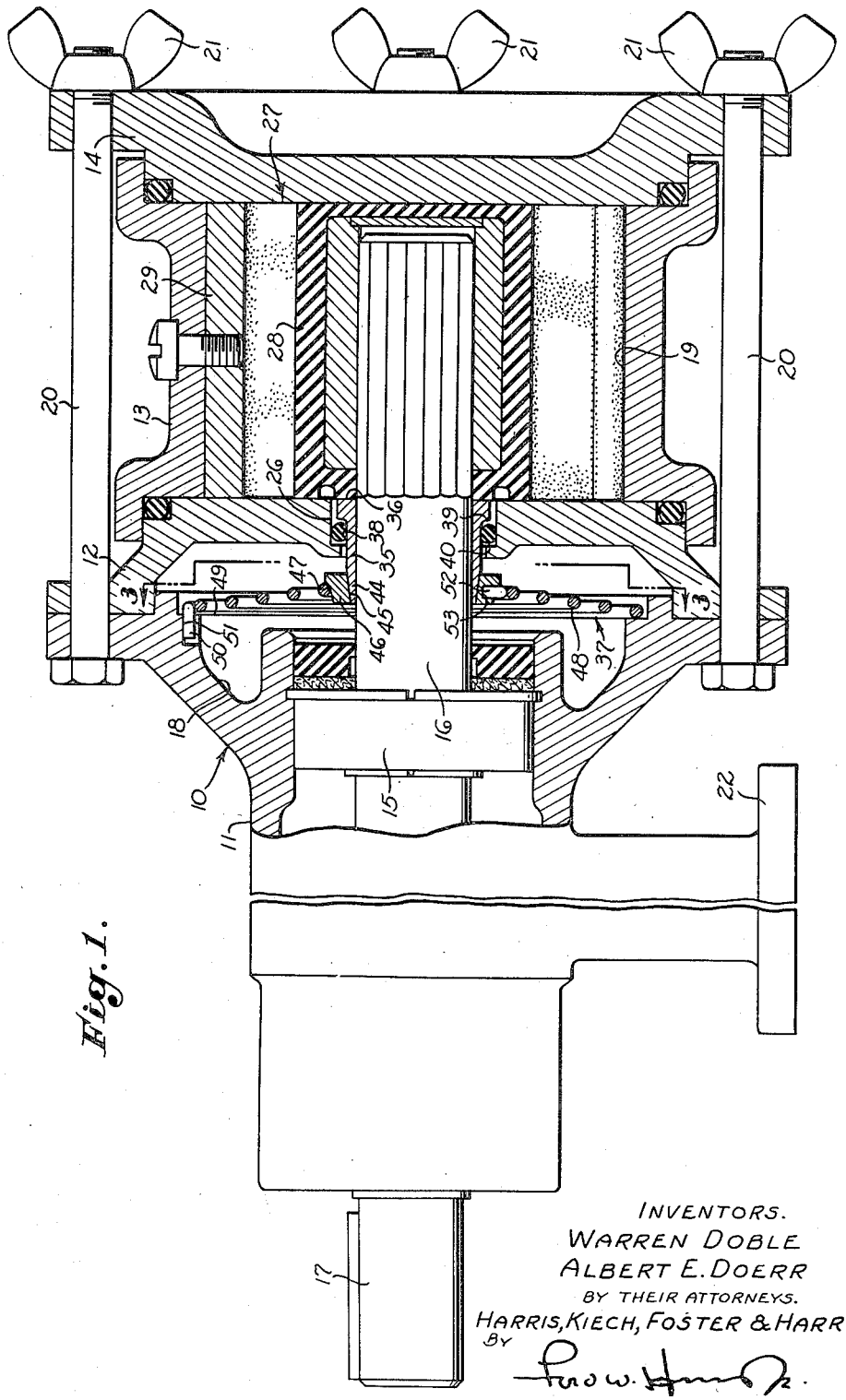
Fig. 1 is a side view, partially in elevation and partially in section, of a pump embodying the shaft seal of the invention.

Referring first to Fig. 1 of the drawings, illustrated therein is a pump having a housing or housing means 10 which is divided into four sections 11, 12, 13 and 14. The housing section 11 includes a tubular portion having therein bearings, such as a bearing 15, for a shaft 16 having an end 17 adapted to be connected to a suitable driving means, not shown. The tubular portion of the housing section 11 terminates in an annular flange which cooperates with the housing section 12 to form therebetween a chamber 18 for a purpose to be described. The housing section 12 forms an end wall of a pumping chamber 19, the peripheral wall of the pumping chamber being defined by the housing section 13, which fits over a portion of the housing section 12, and the other end wall of the pumping chamber being defined by the housing section 14, a portion of which fits into the housing section 13. The housing sections are held in assembled relation by bolts 20 which extend through the flange on the housing section 11 and which extend through the housing sections 12 and 14, the bolts 20 being provided with wing nuts 21 in the particular construction illustrated so that the housing sections 12, 13 and 14 may be readily detached from the housing section 11 for cleaning, or cleaning and sterilization, of the walls of the pumping chamber 19. The housing section 11 is provided with a base 22 for mounting the pump.

The shaft 16 extends through the chamber 18 into the pumping chamber 19, the housing section 12 being provided with a central opening 26 therethrough for the shaft. Carried by the shaft within the pumping chamber 19 is an impeller or impeller means 27 of rubber-like material, the term "rubber-like" being intended to include synthetic rubbers, as well as natural rubbers. The impeller 27 includes an integral hub 28 which is cup-shaped so that it encloses the end of the shaft 16 which projects into the pumping chamber 19, the ends of the hub bearing against the end walls of the pumping chamber. The impeller 27 cooperates with a cam 29 in the pumping chamber to achieve a pumping action, reference being made to Patent No. 2,189,356, issued February 6, 1940, to Arthur M. Briggs, for a complete description of the structure and mode of operation of rubber impellered pumps.

Since the end of the shaft 16 which projects into the pumping chamber 19 is completely enclosed by the impeller hub 28, it is necessary only to employ a shaft seal adjacent the open end of the cup-shaped hub, which is an important feature. The shaft seal of the invention includes a sealing sleeve 35 which encompasses the shaft 16 and which is provided with an end 36 bearing against one end of the hub 28. As best shown in Fig. 2, a slight clearance is provided between the shaft and the sealing sleeve to permit rotation of the shaft relative to the sleeve. The end 36 of the sealing sleeve 35 is biased into sealing engagement with the hub 28 by a biasing means 37 which is disposed in the chamber 18 and which will be described in detail in subsequent paragraphs. Thus, the sealing contact between the end 36 of the sealing sleeve 35 and the hub 28 keeps the fluid being pumped from coming in contact with the shaft 16. Leakage from the pumping chamber 19 into the chamber 18 externally of the sealing sleeve 35 is prevented by an annular sealing element 38, such as an O-ring, disposed between a shoulder 39 on the sealing sleeve 35 and a shoulder 40 extending inwardly from the peripheral wall of the opening 26, the O-ring 38 being in sealing contact with the outer periphery of the sealing sleeve 35 and with the periphery of the opening 26.

Considering the biasing means 37, the sealing sleeve 35 is provided with a frusto-conical end or plug portion 44 which fits into a frusto-conical socket or socket portion 45 of a collar 46, the latter having a shoulder 47 for the smaller end of a conical spring 48. The larger end of the spring 48 is seated against a shoulder 49 on the housing section 11. The outer end 50 of the spring 48 fits into a notch 51 in the housing section 11 and the inner end 52 of the spring fits into a recess 53 in the collar 46. Thus, the spring 48 is secured to the housing section 11 and the collar 46 is secured to the spring so as to prevent rotation of the spring relative to the housing and the collar relative to the spring. The frusto-conical end 44 of the sealing sleeve 35 makes a tight fit in the frusto-conical socket 45, the collar 46 being held tightly against the sealing sleeve by the spring 48. This, coupled with the resistance to rotation offered by the O-ring 38, prevents rotation of the sealing sleeve 35, thereby confining wear to the interface between the sealing sleeve and the hub 28, which is an important feature.

Whenever it is necessary to clean, or to clean and sterilize, the pump, the wing nuts 21 are removed so that the housing sections 14 and 13 may be removed. Thereafter, the impeller 27 is removed from the shaft 16, whereupon the housing section 12, the sealing sleeve 35 and the O-ring 38 may be removed. The foregoing are all of the elements that need to be removed for cleaning, or for cleaning and sterilization, it being unnecessary to remove the shaft 16 since, as hereinbefore discussed, the fluid being pumped does not come in contact therewith, such contact being prevented by the sealing engagement between the sealing sleeve 35 and the hub 28 and the sealing engagement between the O-ring 38 and the sealing sleeve and housing section 12. Also, since the shaft seal of the invention excludes the fluid being pumped from the chamber 18, it is unnecessary to remove any of the elements of the biasing means 37 for cleaning, or for cleaning and sterilization. Consequently, it will be seen that by making the sealing sleeve 35 separable from the collar 46 and the other elements of the biasing means 37, the number of parts with which the fluid being pumped comes in contact is minimized, which is an important feature of the invention.

Referring to Fig. 4 of the drawings, the embodiment illustrated therein is substantially identical to that illustrated in Figs. 1 to 3, the only difference being the substitution of a diaphragm spring 60 for the conical coil spring 48. The diaphragm spring 60 is provided with tabs 61 and 62 which engage the housing section 11 and the collar 46, respectively, to prevent rotation of the spring relative to the housing and to prevent rotation of the collar relative to the spring.

The embodiment of Fig. 5 is also substantially identical to that illustrated in Figs. 1 to 3, and differs therefrom principally in the addition of a removable retainer 70 for the O-ring 38, this retainer having an inturned flange 71 which serves the same function as the shoulder 40 described previously. The embodiment of Fig. 5 also differs in providing a sealing sleeve 72 having adjacent the hub 28 an annulus 73 of wear-resistant material. In all other respects, the embodiment of Fig. 5 differs from that of Figs. 1 to 3 only in minor structural details which need not be discussed herein.

Although we have disclosed various exemplary embodiments of our invention herein, it will be understood that minor changes, substitutions and modifications may be incorporated therein without necessarily departing from the spirit of the invention.

We claim as our invention:

1. In combination: a housing providing axially-spaced biasing-means and rotor chambers; a shaft rotatably mounted in said housing and extending through said biasing-means chamber into said rotor chamber and terminating within said rotor chamber; a rotor in said rotor chamber and having a hub removably mounted on said shaft, said hub having an opening in one end into which said shaft extends and being closed at its other end so that it completely encloses that portion of said shaft which extends into said rotor chamber; and an annular sealing device encompassing said shaft and engaging said one end of said hub and said housing to prevent leakage from said rotor chamber along said shaft into said biasing-means chamber, said sealing device including an annular sealing element engageable with said one end of said hub and movable axially of said shaft, including annular sealing means between said sealing element and said housing, and including biasing means located in said biasing-means chamber and engaging said sealing element for biasing said sealing element into engagement with said one end of said hub, whereby no contamination of said shaft and said biasing means by a material in said rotor chamber occurs, while permitting removal of said rotor from said shaft.

2. In a device for sealing with respect to an element fixed on a shaft rotatably mounted in a housing, the combination of: a sealing sleeve encompassing said shaft and having one end in sealing engagement with said element, said shaft and said element being rotatable relative to said sealing sleeve and said sealing sleeve having a frusto-conical plug portion converging away from said end thereof; a collar encircling said shaft and having a frusto-conical socket portion converging away from said end of said sealing sleeve and receiving and engaging said frusto-conical plug portion of said sealing sleeve; spring means engaging said housing and said collar for biasing said one end of said sealing sleeve into sealing engagement with said element; means securing said spring means to said housing and said collar to said spring means, including interengageable elements on said spring means and said housing and interengageable elements on said collar and said spring means, for preventing relative rotation of said housing, said spring means and said collar; and an annular sealing element encircling said sealing sleeve and disposed between and engaging said sealing sleeve and said housing.

References Cited in the file of this patent

UNITED STATES PATENTS

| | | |
|---|---|---|
| 1,329,948 | Bisconer | Feb. 3, 1920 |
| 1,404,717 | Humphrey | Jan. 24, 1922 |
| 1,486,312 | Ullman | Mar. 11, 1924 |
| 1,898,278 | Weis | Feb. 21, 1933 |
| 1,912,408 | Schelhammer | June 6, 1933 |
| 1,926,006 | Kohler | Sept. 5, 1933 |
| 1,972,393 | Radford | Sept. 4, 1934 |
| 2,038,855 | Rosenblad | Apr. 28, 1936 |
| 2,049,955 | Gilbert | Aug. 4, 1936 |
| 2,052,474 | Johnson | Aug. 25, 1936 |
| 2,075,148 | Svenson | Mar. 30, 1937 |
| 2,104,355 | Rupp et al. | Jan. 4, 1938 |
| 2,157,597 | Dupree | May 9, 1939 |
| 2,189,356 | Briggs | Feb. 6, 1940 |
| 2,215,034 | Gorman | Sept. 17, 1940 |
| 2,233,599 | Gilbert | Mar. 4, 1941 |

(Other references on following page)

UNITED STATES PATENTS

| | | |
|---|---|---|
| 2,247,454 | Thomson | July 1, 1941 |
| 2,395,359 | Vedovell | Feb. 19, 1946 |
| 2,419,588 | Pasco | Apr. 29, 1947 |
| 2,455,194 | Rumsey | Nov. 30, 1948 |
| 2,531,079 | Payne | Nov. 21, 1950 |
| 2,533,399 | Sadler et al. | Dec. 12, 1950 |
| 2,605,715 | Brant | Aug. 5, 1952 |
| 2,636,479 | Smyser | Apr. 28, 1953 |
| 2,648,287 | Thoren et al. | Aug. 11, 1953 |
| 2,659,313 | Carson | Nov. 17, 1953 |

FOREIGN PATENTS

| | | |
|---|---|---|
| 102,859 | Australia | Dec. 21, 1937 |
| 461,446 | Germany | June 22, 1928 |
| 625,898 | Great Britain | July 6, 1949 |